United States Patent
Li et al.

(10) Patent No.: US 10,082,946 B2
(45) Date of Patent: Sep. 25, 2018

(54) METHOD OF ADJUSTING WINDOW AND ELECTRONIC APPARATUS THEREOF

(71) Applicant: Acer Incorporated, New Taipei (TW)

(72) Inventors: Wei-Yi Li, New Taipei (TW);
Chung-Hsien Lee, New Taipei (TW);
Cheng-Han Lin, New Taipei (TW);
Ju-Hsien Weng, New Taipei (TW);
Ren-Wei He, New Taipei (TW)

(73) Assignee: Acer Incorporated, New Taipei (TW)

( * ) Notice: Subject to any disclaimer, the term of this patent is extended or adjusted under 35 U.S.C. 154(b) by 358 days.

(21) Appl. No.: 15/087,724

(22) Filed: Mar. 31, 2016

(65) Prior Publication Data
US 2017/0068435 A1 Mar. 9, 2017

(30) Foreign Application Priority Data
Sep. 8, 2015 (TW) .............................. 104129689 A

(51) Int. Cl.
| | |
|---|---|
| *G06F 3/048* | (2013.01) |
| *G06F 3/0485* | (2013.01) |
| *G06F 3/0481* | (2013.01) |
| *G06F 3/0482* | (2013.01) |
| *G06F 3/0484* | (2013.01) |

(52) U.S. Cl.
CPC ........ *G06F 3/04855* (2013.01); *G06F 3/0482* (2013.01); *G06F 3/04817* (2013.01); *G06F 3/04842* (2013.01)

(58) Field of Classification Search
CPC ........................... G06F 3/04855; G06F 3/0481
See application file for complete search history.

(56) References Cited

U.S. PATENT DOCUMENTS

| | | | | |
|---|---|---|---|---|
| 2012/0169768 A1* | 7/2012 | Roth | ..................... | G06F 3/0485 345/629 |
| 2013/0120295 A1* | 5/2013 | Kim | ........................ | G06F 3/01 345/173 |

FOREIGN PATENT DOCUMENTS

| | | |
|---|---|---|
| TW | 200813806 | 3/2008 |
| TW | 201506762 | 2/2015 |

* cited by examiner

*Primary Examiner* — Matthew Ell
(74) *Attorney, Agent, or Firm* — J.C. Patents

(57) ABSTRACT

A method of adjusting windows and an electronic apparatus are provided. The method includes the following steps. A number of icons are displayed at the first screen, where the icons are respectively corresponding to programs being executed. A movement condition of the icons is detected. When multiple first icons from the icons are moved to a first side of the first screen, multiple first windows of the programs corresponding to the first icons are displayed on a second screen, and at least one scrolling bar is displayed at the first side of the first screen. A relative display position of the first windows on the second screen is adjusted according to a relative position of the at least one scrolling bar at the first side.

10 Claims, 4 Drawing Sheets

METHOD OF ADJUSTING WINDOW AND ELECTRONIC APPARATUS THEREOF

CROSS-REFERENCE TO RELATED APPLICATION

This application claims the priority benefit of Taiwan application serial no. 104129689, filed on Sep. 8, 2015. The entirety of the above-mentioned patent application is hereby incorporated by reference herein and made a part of this specification.

BACKGROUND

Field of the Invention

The invention is directed to an adjustment method and more, particularly, to a method of adjusting windows and an electronic apparatus thereof.

Description of Related Art

Along with the progress in electronics industry and display technologies, executing a plurality of programs on a single computer and displaying multiple windows of the programs on a computer screen is no longer difficult at present. Based on the multiple windows that are simultaneously displayed, a computer user can operate different programs or complete corresponding tasks by referring to different information at the same time. For instance, when browsing a foreign auction website, the user can open another window of a currency conversion operation for calculating product prices.

When multiple windows are simultaneously displayed on the computer screen, the user are allowed to adjust the sizes of the windows for an optimized display effect. To be specific, the user can click and drag a window frame to change the size and the position of the window through an input interface, such as a mouse or a keyboard. However, the aforementioned adjusting manner would lead to complicacy in the adjusting process as the number of the windows is increased. Moreover, after the adjustment, if one window shields the others, the windows have to be readjusted. Thus, how to provide an intuitive and convenient method of adjusting the windows is a goal for the technicians in the art to achieve.

SUMMARY

The invention is directed to a method of adjusting windows and an electronic apparatus thereof, in which at least one scrolling bar corresponding to at least one border between windows is provided, such that a user can adjust a relative display position of the windows more intuitively and conveniently.

According to an embodiment, a method of adjusting windows is provided. The method includes the following steps. A plurality of icons are displayed on a first screen, wherein the icons are respectively corresponding to a plurality of programs being executed. A movement condition of the icons is detected. When a plurality of first icons from the icons are moved to a first side of the first screen, a plurality of first windows of the programs corresponding to the first icons are displayed on a second screen, and at least one scrolling bar is displayed at the first side of the first screen. A relative position of the at least one scrolling bar at the first side is detected. A relative display position of the first windows on the second screen is adjusted according to the relative position of the at least one scrolling bar at the first side.

According to another embodiment of the invention, an electronic apparatus is provided. The electronic apparatus includes a processing unit, a first screen, a second screen and a detecting module. The first screen, the second screen and the detecting module are coupled to the processing unit. The first screen displays a plurality of icons. The icons are respectively corresponding to a plurality of programs being executed by the processing unit. The detecting module detects a movement condition of the icons. When the detecting module detects that a plurality of first icons from the icons are moved to a first side of the first screen, the processing unit displays a plurality of first windows of the programs corresponding to the first icons on the second screen and displays at least one scrolling bar at the first side of the first screen. The detecting module further detects a relative position of the at least one scrolling bar at the first side, and the processing unit adjusts a relative display position of the first windows on the second screen according to the relative position of the at least one scrolling bar at the first side.

To sum up, in method of adjusting the windows and the electronic apparatus thereof provided by the embodiments of the invention, a plurality of icons corresponding to a plurality of programs are first displayed on the first screen, the corresponding windows are displayed on the second screen when a user drags a part of the icons to the first side of the first screen, and then, a plurality of scrolling bars are displayed at the first side of the first screen. Through operating the scrolling bar, the user can adjust the relative display position on the second screen. In this way, the user can adjust sizes and positions of the windows on the second screen in a more intuitive and simple way to avoid complicacy in the adjusting process. Meanwhile, as a plurality of corresponding windows are displayed on the second screen, the relation between at least two corresponding windows can be simultaneously adjusted, without the corresponding windows shielding the contents of each other.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In a method of adjusting windows and an electronic apparatus provided by the embodiments of the invention, at least one scrolling bar is provided at a first side of a first screen in correspondence to a plurality of windows displayed on a second screen. A user can adjust a relative position of the scrolling bar at the first side of the first screen by dragging the scrolling bar on the first screen. In this case, a relative display position of the windows on the second screen are also correspondingly adjusted in response to the change of the scrolling bar.

Figure 1A:
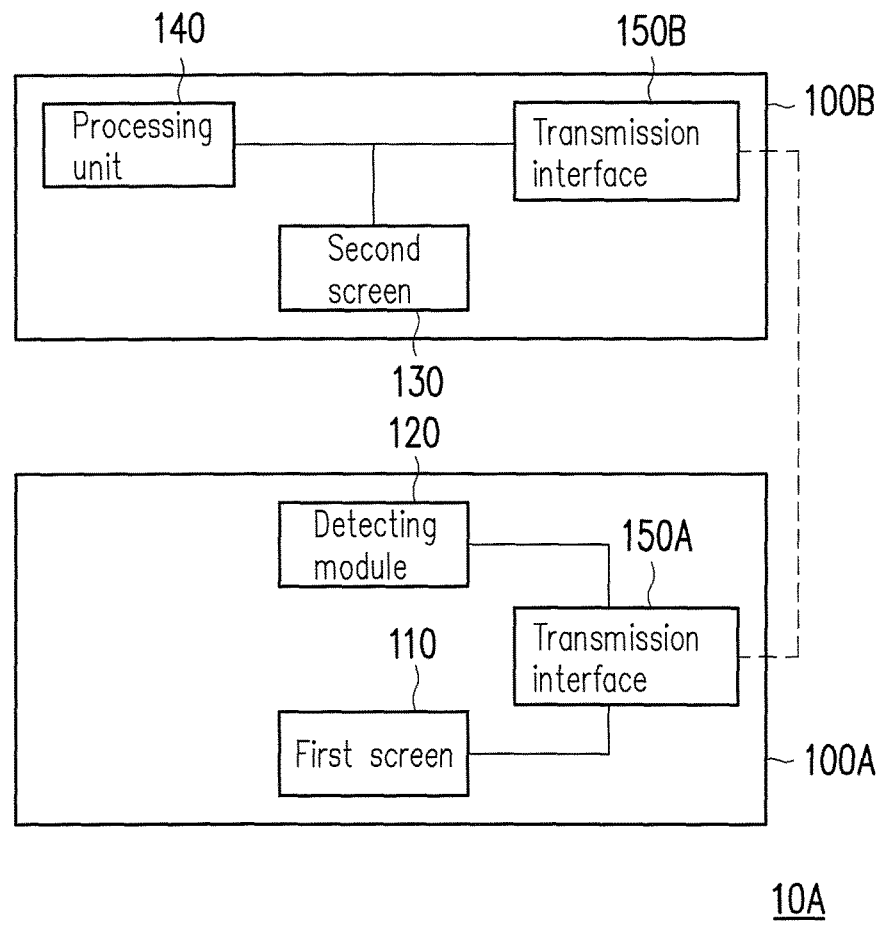
FIG. 1A is a schematic diagram illustrating an electronic apparatus according to an embodiment of the invention.

FIG. 1A is a schematic diagram illustrating an electronic apparatus according to an embodiment of the invention. Referring to FIG. 1A, an electronic apparatus 10A is, for example, a composite electronic apparatus formed by a child apparatus 100A and a mother apparatus 100B. The child apparatus 100A is, for example, a mobile apparatus, such as a tablet computer or a smart phone, and the mother apparatus 100B is, for example, a computing apparatus, such as a notebook computer, a desktop computer or a server. Generally, the child apparatus 100A when being separated from the mother apparatus 100B may be independently used. However, as the child apparatus 100A and the mother apparatus 100B are connected with each other as a composite electronic apparatus, the child apparatus 100A serves as, for example, a secondary screen and a secondary input interface of the electronic apparatus 10A.

In the present embodiment, the child apparatus 100A includes a first screen 110, a detecting module 120, and the mother apparatus 100B includes a second screen 130 and a processing unit 140. The first screen 110, the detecting module 120 and the second screen 130 are coupled to the processing unit 140. It should be noted that in the present embodiment, the first screen 110 and the detecting module 120 are coupled to the processing unit 140 in a wired or a wireless manner through a transmission interface 150A of the child apparatus 100A and a transmission interface 150B of the mother apparatus 100B.

In an embodiment of the invention, each of the first screen 110 and the second screen 130 is, for example, a touch display screen including a display unit and a touch unit, but the invention is not limited thereto. The display unit is, for example, a liquid crystal display (LCD) unit or a light-emitting diode (LED), and the touch unit is, for example, a capacitive touch unit, a resistive touch unit or an optical touch unit. In other embodiments of the invention, each of the first screen 110 and the second screen 130 may also be selected as a simple display screen equipped with no touch function. In this circumstance, the child apparatus 100A or the mother apparatus 100B may be equipped with an input interface of other types, such as a keyboard, a mouse or the like, for an operation, e.g., inputting or clicking.

The detecting module 120 is configured to detect a user's input operation on the child apparatus 100A. For instance, in a scenario that the first screen 110 of the child apparatus 100A is a touch display screen, the detecting module 120 is coupled to the first screen 110 and configured to detect the user's touch operation on the first screen 110. The processing unit 140 may be, for example, a central processing unit (CPU) or other programmable devices for general purpose or special purpose such as a microprocessor, a digital signal processor (DSP), a programmable controller, or other similar devices or a combination of above-mentioned devices.

The transmission interfaces 150A and 150B may be, for example, wireless transmission interfaces supporting various wireless communication protocols, such as the Bluetooth, WiFi, worldwide interoperability for microwave access (WiMAX), near field communication (NFC), long term evolution (LTE) and so on. In an embodiment of the invention, the transmission interfaces 150A and 150B may be wired transmission interfaces for connection through an asymmetric digital subscriber line (ADSL), a cable modem or a universal serial bus (USB). In another embodiment of the invention, the transmission interfaces 150A and 150B may be, for example, composite transmission interfaces including the wireless transmission interface and the wired transmission interface.

Figure 1B:
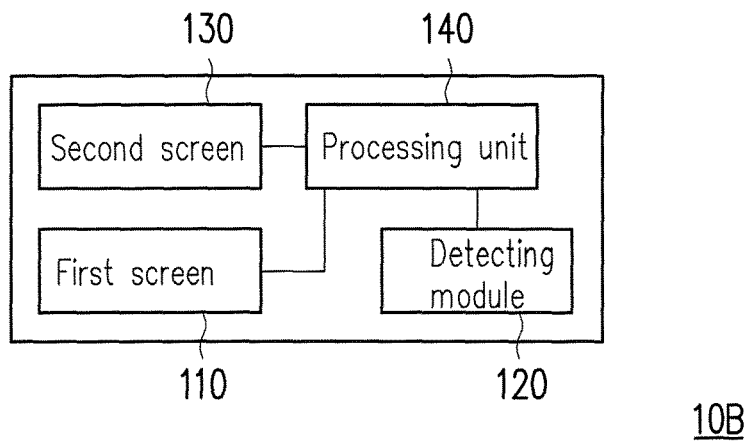
FIG. 1B is a schematic diagram illustrating an electronic apparatus according to another embodiment of the invention.

It should be noted that the electronic apparatus provided by the embodiment of the invention is not limited to the composite electronic apparatus (i.e., the electronic apparatus 10A) formed by the child apparatus 100A and the mother apparatus 100B, and FIG. 1B is a schematic diagram illustrating an electronic apparatus according to another embodiment of the invention. Referring to FIG. 1B, an electronic apparatus 10B includes a first screen 110, a detecting module 120, a second screen 130 and a processing unit 140, which do not need the abovementioned transmission interfaces for connecting together. Detailed configuration of the first screen 110, the detecting module 120, the second screen 130 and the processing unit 140 may refer to the embodiment above and will not be repeated hereinafter.

Figure 2:
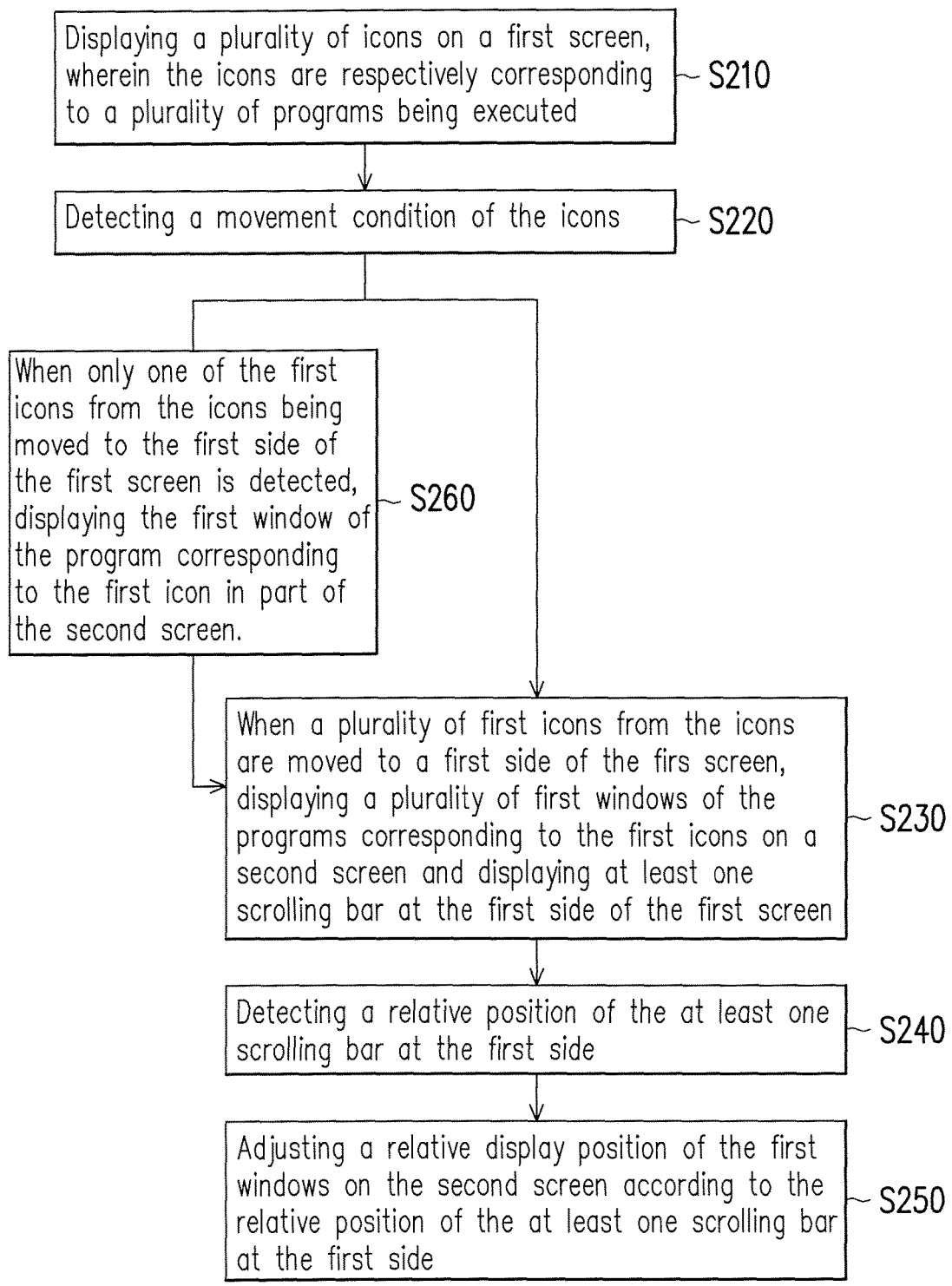
FIG. 2 is a flowchart illustrating a method of adjusting windows according to an embodiment of the invention.

FIG. 2 is a flowchart illustrating a method of adjusting windows according to an embodiment of the invention. The method of adjusting windows illustrated in FIG. 2 is applicable to the electronic apparatuses illustrated in FIG. 1A and FIG. 1B, but the invention is not limited thereto. Referring to FIG. 1A, FIG. 1B and FIG. 2, in the method of adjusting windows, a plurality of icons are displayed on the first screen 110, wherein the icons are respectively corresponding to a plurality of programs executed by the processing unit 140 (step S210). To be specific, the processing unit 140 displays representative icons of the programs that are not executed in the background on the first screen 110. Thereby, the user of the electronic apparatus 10A or 10B may determine which programs are being executed by the processing unit 140 through the first screen 110. Then, the detecting module 120 detects a movement condition of the icons in the first screen (step S220). In the present embodiment, the first screen 110 is, for example, a touch display screen integrated with a display function and a touch function, and the detecting module 120 detects a moving trajectory of the user pressing and dragging the icons.

Figure 3:
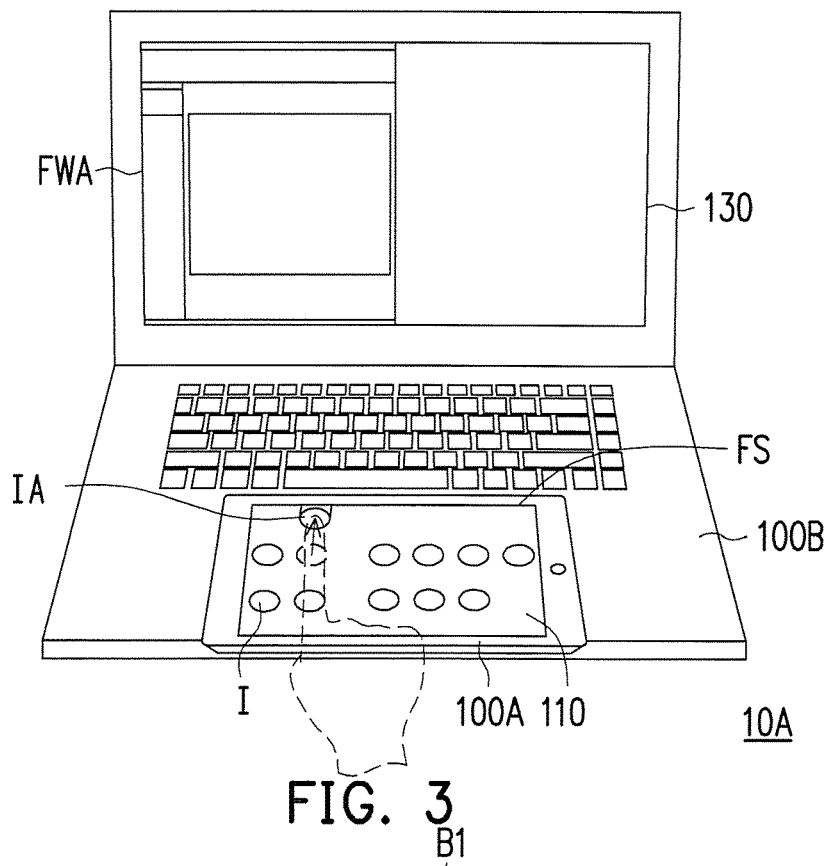
FIG. 3 schematically illustrates a condition of displaying a window according to an embodiment of the invention.

When the detecting module 120 detects that only one first icon from the icons is moved to a first side of the first screen, the processing unit 140 displays a window of the program corresponding to the first icon in part of the second screen 130 (step S260). FIG. 3 schematically illustrates a condition of displaying a window according to an embodiment of the invention. Referring to FIG. 3, in the present embodiment, a plurality of icons I are displayed on the first screen 110 of the electronic apparatus 10A, and the icons I are respectively corresponding to the programs executed by the processing unit 140. When the detecting module 120 detects that the user moves an icon IA (i.e., a first icon IA) from the icons I to a first side FS of the first screen 110, the processing unit 140 displays a window FWA (i.e., a first window FWA) of a program corresponding to the icon IA on part of the second screen 130. In the present embodiment, the first side FS is a side of the first screen 110 that is adjacent to the second screen 130, but the invention is not limited thereto. In other embodiments of the invention, the first side may be a side of the first screen 110 that is far from the second screen 130.

Specifically, in the present embodiment, when the user drags the icon IA to the first side FS of the first screen 110, the processing unit 140 determines the dragging operation as the user intending to display the window FWA on the second screen 130. In this circumstance, the processing unit 140 displays the window FWA on part of the second screen 130, such that the user of the electronic apparatus 10A views it to perform a subsequent operation. In an embodiment of the invention, the processing unit may also determine whether to display the window FWA on the left part or the right part of the second screen 130 according to whether the icon IA is dragged to the left or the right of the first side FS. In term of the embodiment illustrated in FIG. 3, the icon IA is dragged to the left of the first side FS, the processing unit 140 displays the window FWA of the program corresponding to the icon IA on the left part of the second screen 130.

Figure 4:
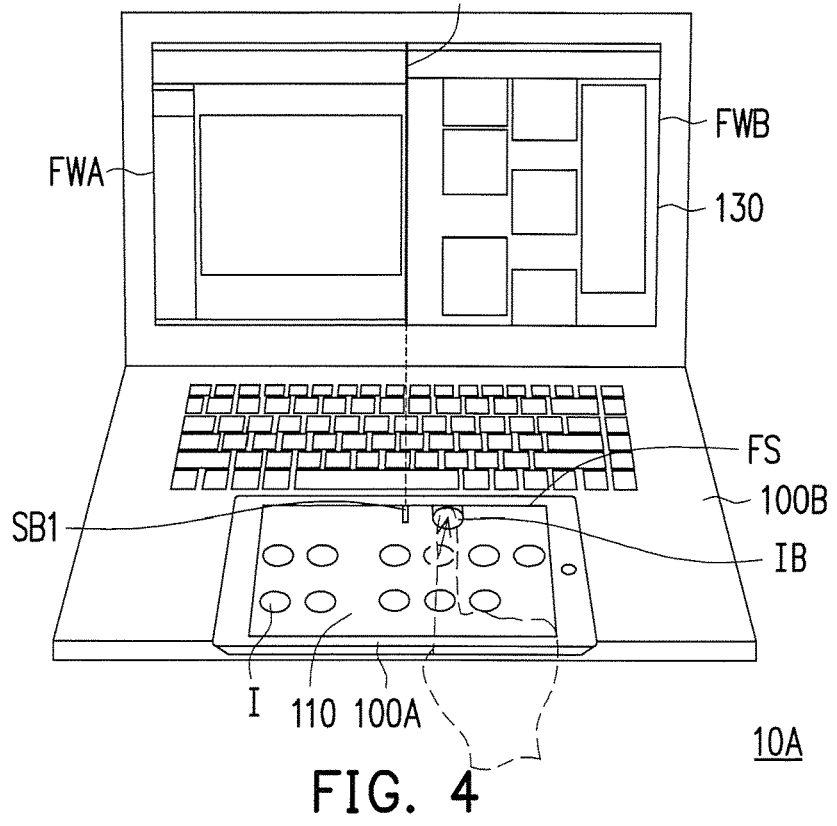
FIG. 4 schematically illustrates a condition of displaying windows according to another embodiment of the invention.

Referring again to FIG. 2, when the detecting module 120 detects that a plurality of first icons from the icons are moved to the first side of the first screen 110, the processing unit 140 displays a plurality of first windows of the programs corresponding to the first icons on the second screen 130 and displays at least one scrolling bar at the first side of the first screen 110 (step S230). FIG. 4 schematically illustrates a condition of displaying windows according to another embodiment of the invention. To be detailed, FIG. 3 and FIG. 4 are continuous schematic diagrams illustrating the conditions of displaying the windows. Referring to FIG. 3, the detecting module 120 first detects that a single icon IA is moved to the first side FS of the first screen 110, and in this circumstance, the processing unit 140 display the window FWA on part of the second screen 130. Then, referring to FIG. 4, the detecting module 120 further detects that another icon IB (i.e., a first icon IB) from the icons I is moved to the first side FS of the first screen 110. In this circumstance, the detecting module 120 detects that multiple icons IA and IB are moved to the first side FS of the first screen 110, and besides displaying the window FWA and a window FWB (i.e., a first window FWB) of the programs corresponding to the icons IA and IB on the second screen 130, the processing unit 140 further displays a scrolling bar SB1 at the first side FS of the first screen 110.

Specifically, the windows FWA and FWB are displayed on the second screen 130 without overlapping each other. The processing unit 140 juxtaposes and displays the windows FWA and FWB in the second screen 130, and thus, a juxtaposition border B1 is between the window FWA and the window FWB. The scrolling bar SB1 is displayed at the first side FS of the first screen 110 in correspondence to the juxtaposition border B1 between the window FWA and the window FWB. In the preceding embodiment, only two icons IA and IB and two corresponding windows FWA and FWB are illustrated to exemplarily describe the operation of adjusting the windows, but the invention is not limited thereto. When the detecting module 120 detects that three or more icons are dragged to the first side FS of the first screen 110, the processing unit 140 equally juxtaposes and displays a plurality of windows of a plurality of programs corresponding to the icons in the second screen 130, and displays a plurality of scrolling bars corresponding to the juxtaposition border between each two windows at the first side FS of the first screen 110.

It should be noted that when the user drags the icons IA and IB, the user may not do it like the way illustrated in FIG. 3 and FIG. 4 where the icons IA and IB are typically dragged by the user one by one in sequence to the first side FS of the first screen 110, but instead, the user drags the icons IA and IB simultaneously to the first side FS of the first screen 110. In this circumstance, step S230 is directly performed after step S220 in the method of adjusting the windows to display the windows FWA and FWB on the second screen 130, and to display the scrolling bar SB1 at the first side FS of the first screen 110 in correspondence to the juxtaposition border B1 between the window FWA and the window FWB.

Figure 5:
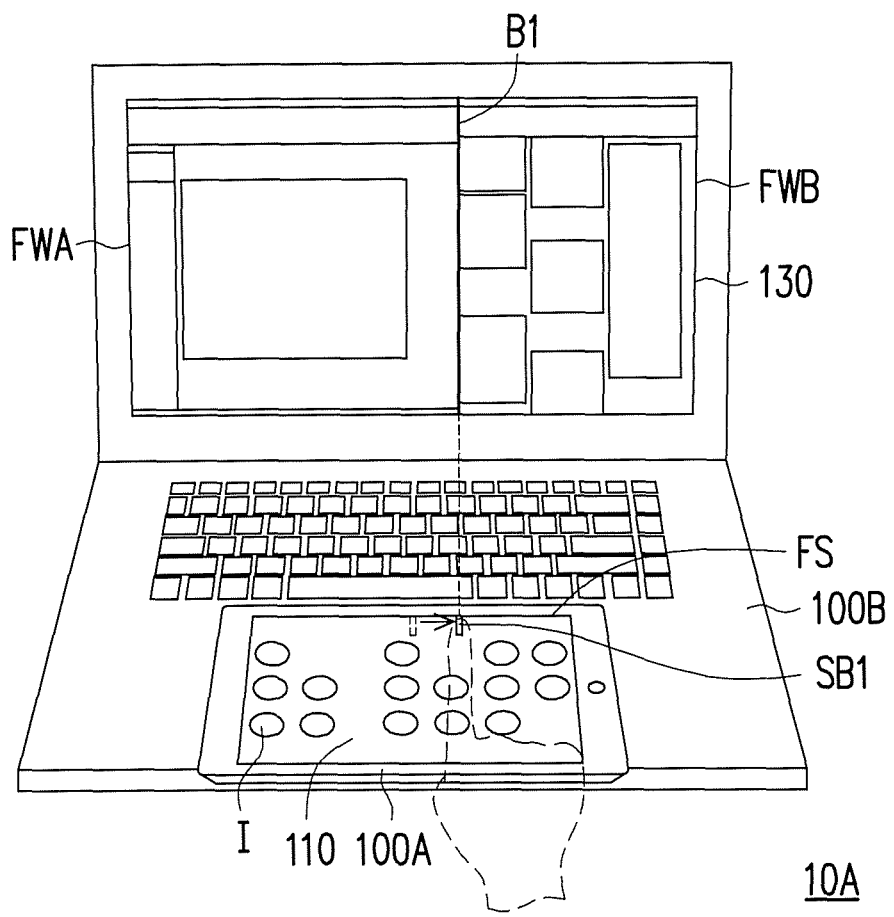
FIG. 5 schematically illustrates the window adjustment according to an embodiment of the invention.

Referring again to FIG. 2, then, the detecting module 120 further detects a relative position of the scrolling bar at the first side FS of the first screen 110 (step S240). Thereafter, the processing unit 140 adjusts relative display position of the first windows on the second screen 130 according to the relative position of the scrolling bar at the first side FS of the first screen 110 (step S250). FIG. 5 schematically illustrates the window adjustment according to an embodiment of the invention. Referring to FIG. 5, in the present embodiment, the processing unit 140 configures the scrolling bar SB1 in correspondence to the juxtaposition border B1 between the windows FWA and FWB. The scrolling bar SB1 may be correspondingly operated to move in parallel to the first side FS on the first screen 110. When the scrolling bar SB1 moves horizontally, the juxtaposition border B1 between the windows FWA and FWB moves horizontally in the same direction on the second screen 130, such that sizes of the windows FWA and FWB changes. In other words, in the present embodiment, the processing unit 140 correspondingly adjusts the sizes and positions of the windows FWA and FWB on the second screen 130 according to the relative position of the scrolling bar SB1 at the first side FS of the first screen 110, so as to change relative display position of the windows FWA and FWB. Referring to FIG. 5, when the user moves the scrolling bar SB1 to the right along the first side FS, the juxtaposition border B1 between the windows FWA and FWB correspondingly moves to the right on the second screen 130, such that the window FWA becomes larger, and the window FWB becomes smaller.

It should be noted that when a plurality of scrolling bars are configured in correspondence to the juxtaposition borders between a plurality of windows at the first side FS of the first screen 110, the user may change a proportion taken by each window on the second screen 130 by adjusting the scrolling bars.

To summarize, in the method of adjusting the windows and the electronic apparatus thereof provided by the embodiments of the invention, a plurality of icons corresponding to a plurality of programs are first displayed on the first screen. When the user drags a part of the icons to the first side of the first screen, the corresponding windows are displayed on the second screen, and then, a plurality of scrolling bars are displayed on the first screen. Through operating the scrolling bars, the user can adjust the relative display position of the windows on the second screen. In this way, the user can adjust the sizes and the positions of the windows on the second screen more intuitively and simply to avoid complicacy in the adjusting process.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of adjusting windows, applicable to an electronic apparatus, comprising:
   displaying a plurality of icons on a first screen, wherein the icons are respectively corresponding to a plurality of programs being executed;
   detecting a movement condition of the icons;
   when a plurality of first icons from the icons are moved to a first side of the first screen, displaying a plurality of first windows of the programs corresponding to the first icons on a second screen and displaying at least one scrolling bar at the first side of the first screen;

detecting a relative position of the at least one scrolling bar at the first side; and adjusting a relative display position of the first windows on the second screen according to the relative position of the at least one scrolling bar at the first side.

2. The method according to claim 1, wherein the first windows are displayed on the second screen without overlapping one another.

3. The method according to claim 1, wherein the step of displaying the first windows on the second screen and displaying the at least one scrolling bar on the first screen further comprises:

displaying the first windows on the second screen, wherein a juxtaposition border is between each two of first windows; and displaying the scrolling bar at the first side of the first screen in correspondence to each of the juxtaposition borders.

4. The method according to claim 3, wherein the step of adjusting the relative display position of the first windows according to the relative position of the at least one scrolling bar at the first side further comprises:

adjusting the juxtaposition border between the first windows to change the relative display position of the first windows according to the relative position of the at least one scrolling bar at the first side.

5. The method according to claim 1, further comprising:

when only one of the first icons from the icons being moved to the first side of the first screen is detected, displaying the first window of the program corresponding to the first icon in part of the second screen.

6. An electronic apparatus, comprising:

a processing unit;

a first screen, coupled to the processing unit and displaying a plurality of icons, wherein the icons are respectively corresponding to a plurality of programs being executed by the processing unit;

a second screen, coupled to the processing unit; and a detecting module, coupled to the processing unit and detecting a movement condition of the icons, wherein when the detecting module detects that a plurality of first icons from the icons are moved to a first side of the first screen, the processing unit displays a plurality of first windows of the programs corresponding to the first icons on the second screen and displays at least one scrolling bar at the first side of the first screen, the detecting module further detects a relative position of the at least one scrolling bar at the first side, and the processing unit adjusts a relative display position of the first windows on the second screen according to the relative position of the at least one scrolling bar at the first side.

7. The electronic apparatus according to claim 6, wherein the first windows are displayed on the second screen without overlapping one another.

8. The electronic apparatus according to claim 6, wherein the processing unit displays the first windows on the second screen, a juxtaposition border is between each two of first windows, and the processing unit displays the scrolling bar at the first side of the first screen in correspondence to each of the juxtaposition borders.

9. The electronic apparatus according to claim 8, wherein the processing unit adjusts the juxtaposition border between the first windows to change the relative display position of the first windows according to the relative position of the at least one scrolling bar at the first side.

10. The electronic apparatus according to claim 6, wherein when the detecting module detects that only one of the first icons from the icons is being moved to the first side of the first screen, the processing unit displays the first window of the program corresponding to the first icon in part of the second screen.

* * * * *